Feb. 13, 1934.  W. R. BREWER  1,946,928
BRAKE MECHANISM
Filed Jan. 24, 1931  5 Sheets-Sheet 1

Inventor
Wm. R. Brewer.
By Geo. Stevens.
Attorney

Feb. 13, 1934.  W. R. BREWER  1,946,928
BRAKE MECHANISM
Filed Jan. 24, 1931  5 Sheets-Sheet 4

Inventor
Wm. R. Brewer.
By Geo. Stevens.
Attorney

Patented Feb. 13, 1934

1,946,928

UNITED STATES PATENT OFFICE 1,946,928

BRAKE MECHANISM

William R. Brewer, Duluth, Minn.

Application January 24, 1931. Serial No. 511,015

2 Claims. (Cl. 188—78)

This invention relates to internal brake mechanisms, particularly adapted for use upon automobiles, wherein it is desired to operate such a device on all four wheels of the vehicle.

The principal object of the invention is to produce a simple and efficient mechanism of this character having maximum braking energy in proportion to the instrumentalities employed.

Another object of the invention is to provide such a mechanism wherein the expansive stress upon the braking elements is approximately equal throughout the entire circumferential area thereof, or in other words uniformly balanced.

A still further object is to provide as noiseless a braking device of this character as possible.

Other objects and advantages of the novel structure will appear in the following description of the invention.

Referring now to the accompanying drawings wherein like reference characters indicate like parts:

Figure 1:
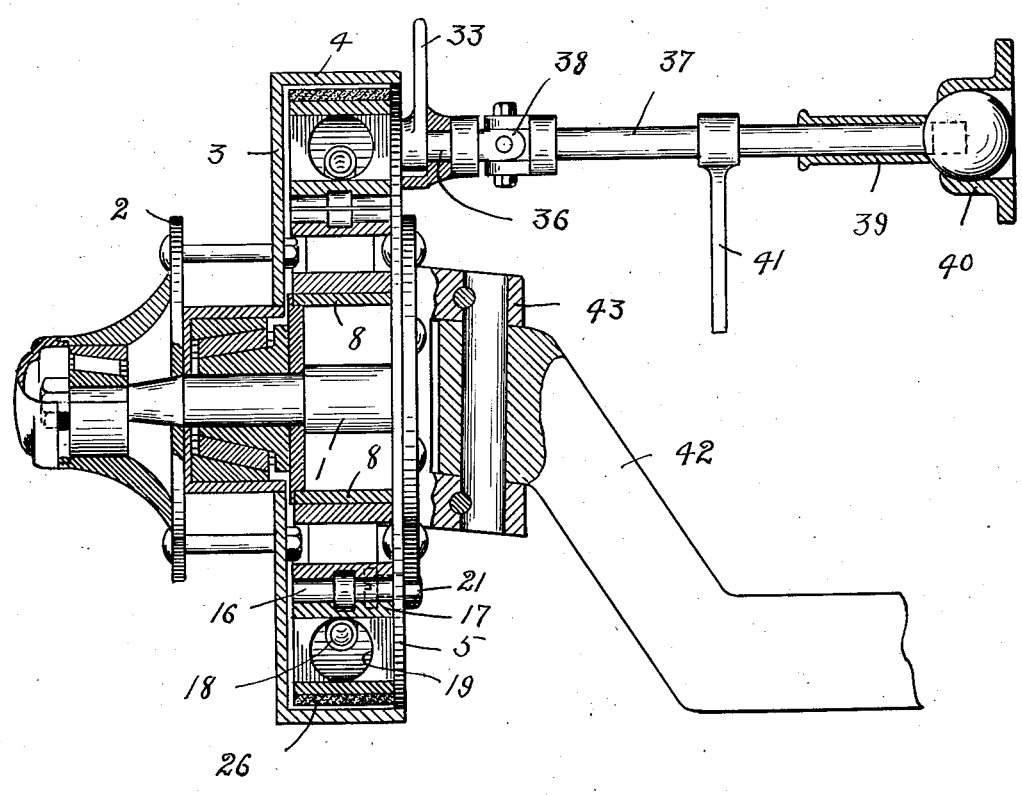
Figure 1 is a vertical sectional view partly in elevation of the front wheel hub of an automobile.
Figure 2:
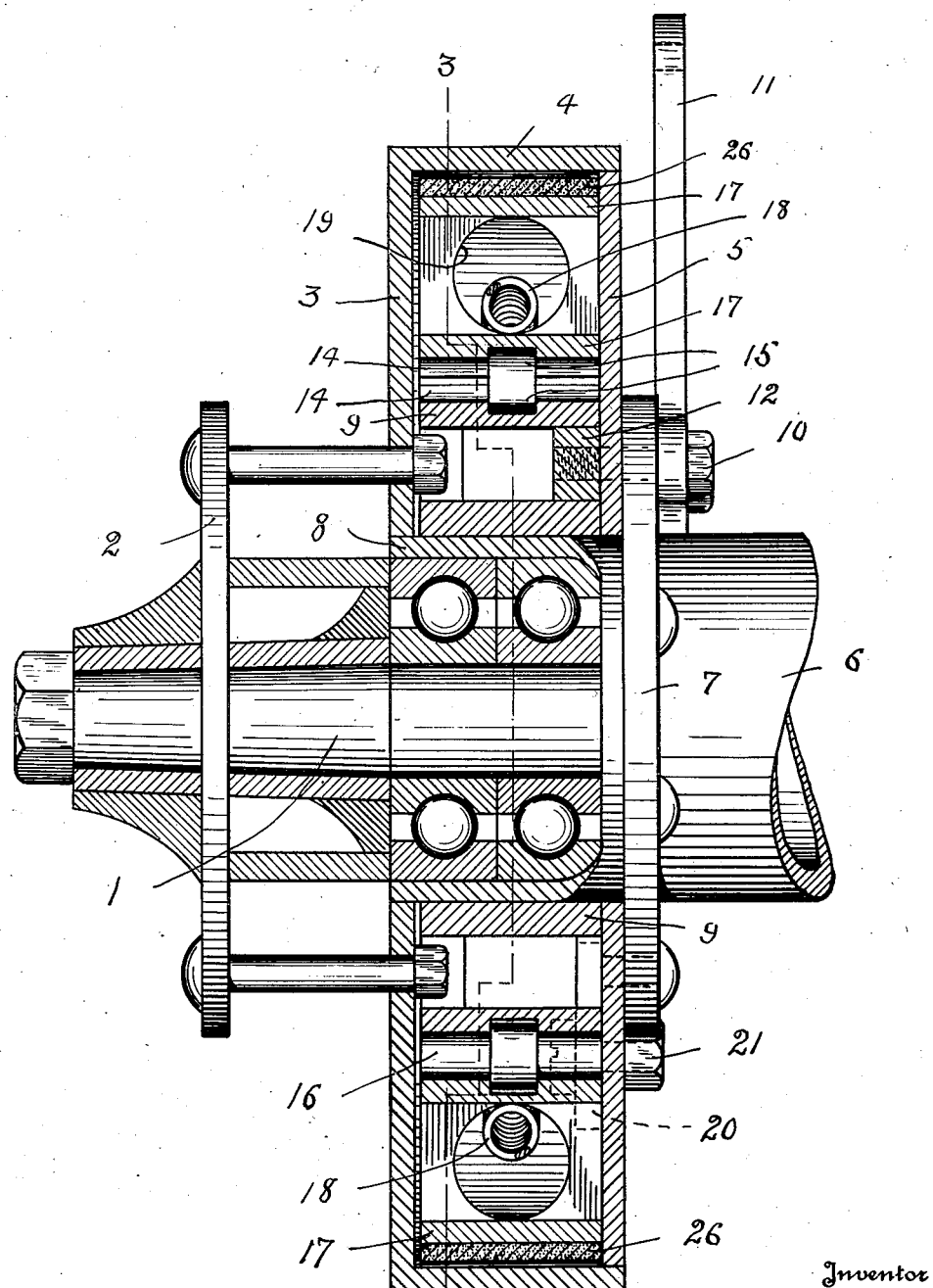
Figure 2 is a similar view of the rear wheel hub of an automobile.

Consideration of the details of construction will first be given to the rear wheel and brake mechanism therefore, as follows:

1 represents the wheel axle spindle and 2 and 3 the hub plates of the wheel, which latter is omitted for convenience of illustration. The plate or disc 3 of the hub in this instance forms the head of the brake drum of the wheel, it having the inwardly projecting annular flange 4 which extends over the circumferential edge of the disc 5 fixed to the axle housing 6 and which members 3, 4 and 5 form the housing for the brake mechanism; the same being common in automobile construction. In this instance I have illustrated the housing 6 as having a flange 7 formed integral therewith and to which the disc 5 is fixed as by suitable rivets; this simply being an immaterial modification of construction. Also, while I have illustrated ball bearings for the wheel in one instance, and roller bearings in another, it is to be understood that this is likewise immaterial, and that the improved brake system is applicable to either.

8 represents a sleeve like extension of the housing 6 which acts as the external housing for the bearing of the wheel and upon which is loosely mounted the circular skeleton collar 9 to which is fixed as by the bolts 10 the control lever 11, these bolts 10 extending through an enlarged web like portion 12 of the skeleton collar, and the bolts 10 being tapped thereinto. The lever 11 has a T-shaped inner end through which the bolts pass for the purpose of covering at all times the concentrically slotted hole 13 formed through the flange 7 and disc 5 which permits of oscillating motion of the lever 11 for functioning of the brake mechanism.

The outer rim of the skeleton ring 9 has formed transverse its circumferential face and in equal spaced relation thereabouts a plurality of semi-circular channels comprising the smaller end channels 14 transverse the deeper circumferential central channel 15 for the reception of stepped rollers 16, said rollers being of a shape to fit one-half in such stepped channels and the other half in similarly shaped channels in the inner circumferential face of the innermost rim of the skeleton shoe segments 17. The proper depths of these channels in relation to the rollers are such that when the shoe segments are in their extreme contractile position, there is ample clearance between the inner rim of the shoes and the outer rim of the ring as clearly illustrated, simultaneously, of course, with the ends of the sections abutting. This contractile stress of the shoes is accomplished by the endless helical spring 18 which is mounted circumferentially about the inner rim of the shoes and passing through the circular opening as indicated at 19 through the ends of the segments, so that equal stress inwardly is exerted upon all of the shoes tending towards equal and silent action of all of the rollers when movement of the cooperative parts takes place. The skeleton shoe segments have an inner and outer rim as previously inferred united by their end walls through which the holes 19 occur, and also each having a central side wall 20 through each of which is installed a holding bolt indicated at 21. The hole for each of such bolts is elongated slightly radially as at 22 so as to permit of free radial action of each shoe when actuated by its respective three supporting rollers, the bolts 21 being stepped bolts, that is bolts having annular shoulders which are held tightly within the disc 5 so that the shoe sections may freely move radially.

Now this radial movement of the shoes is accomplished by partial rotation of the actuating ring 9, and when the latter is moved the rollers 16 being mounted therein must move circumferentially therewith and consequently roll upon the inclined surface of the graduated inclined portions 23 of the channels in the shoes in which the rollers are mounted as previously described, thus forcing same uniformly outwardly for engagement with the inner circumferential surface of the brake drum. On release of such stress upon the lever 11 the contractile helical spring 24 attached to said lever at one end and to the anchorage plate 25 at its opposite end will return the lever to its normal position, thus rotating the ring 9 backwardly, and which action is assisted by the contractile influence of the endless spring 18 before described.

Upon the outer circumferential surface of each shoe segment 17 is fixed as by riveting or other similar manner suitable brake lining as indicated at 26, the same being peculiar in that its outer circumferential surface is concentric with the inner surface of the brake drum so that when forced outwardly it will snugly fit same from end to end, thereby insuring maximum braking contact of the shoes, the only lost space being that insignificant portion intermediate of the ends of the shoes at the four points of contact of same.

This lining is preferably of composition type and either pressed or molded to the shape desired, or shimmed under the ends.

Figure 3:
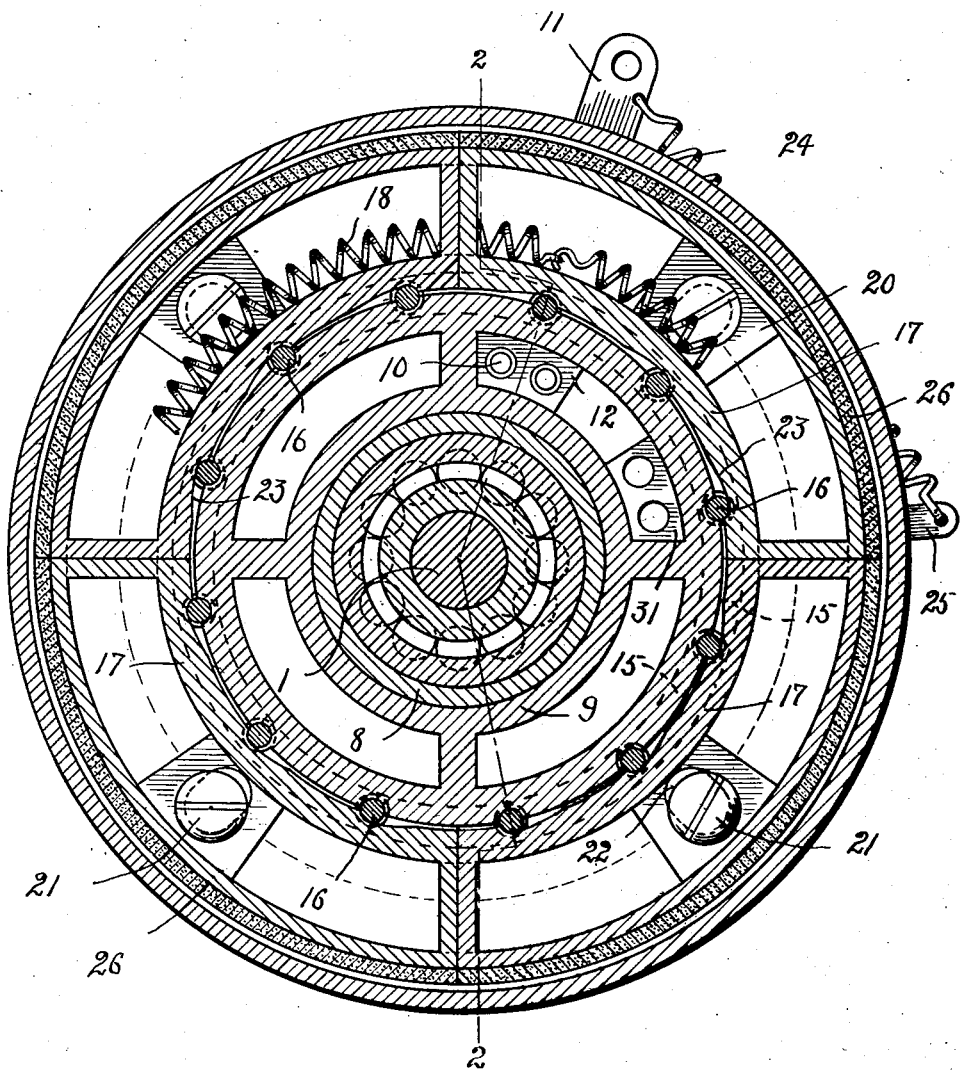
Figure 3 is an enlarged central sectional view on the line 3—3 of Figure 2.
Figure 4:
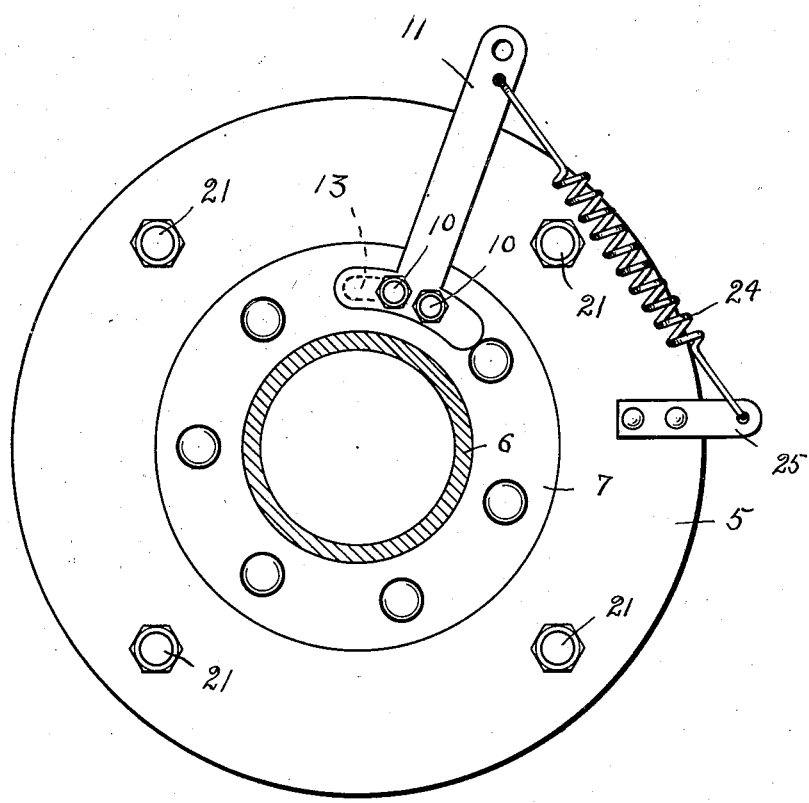
Figure 4 is an inside elevation of the rear wheel hub.
Figure 5:
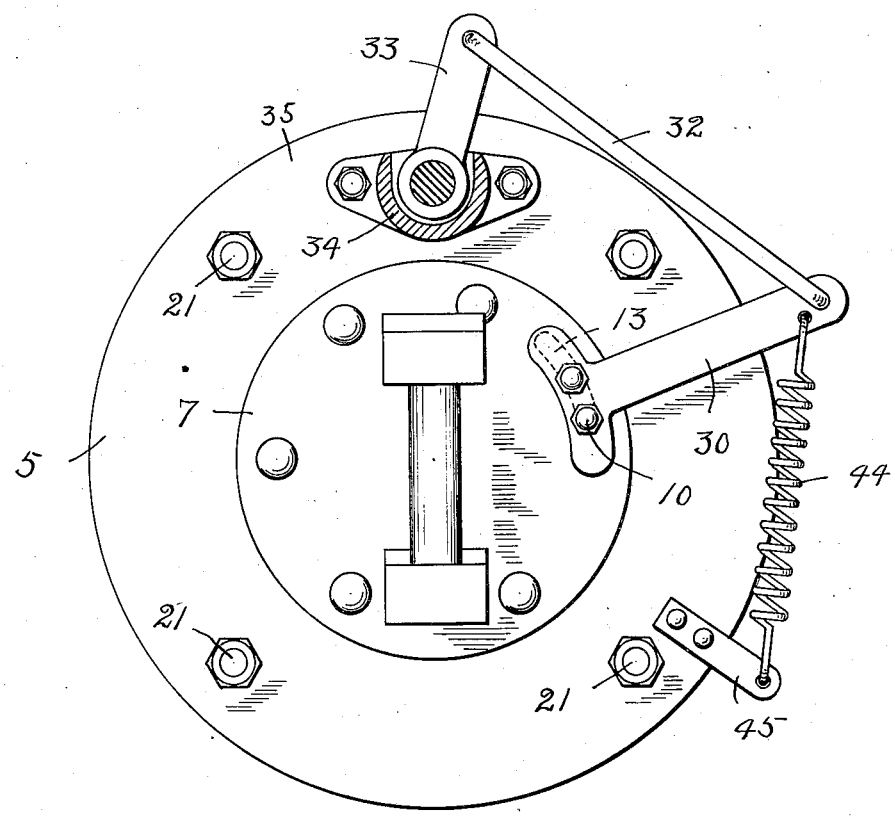
Figure 5 is a similar elevation of the front wheel hub.

Attention is now directed more particularly to Figures 1 and 5 of the drawings which refer to the front wheels of the vehicle which must differentiate slightly from that described in respect to the rear wheels. However all the parts previously described are identical in the front wheels except that the relation of the operating lever 30 is slightly different in its relation to the skeleton ring 9 as compared to the lever 11 previously described. In order to make the skeleton rings interchangeable in this respect I have shown in Figure 3 the web 31 which is identical with the web 12 spaced therefrom and provided with holes for the reception of the lever 30, and the lever 30 is operated by the rod 32 connected with the free end thereof and to the lever 33 fixed as by a suitable bracket 34 to the inner face of the front stationary disc 35, in which bracket the outermost end 36 of the rock shaft 37 is rotatably mounted. The lever, of course, is fixed to said shaft, and in this shaft adjacent the bracket is a universal coupling 38 to provide for the adjustment of the front wheels, as is obviously essential. The opposite end of the shaft 36 is mounted within the sleeve-like extension 39 of the ball and socket joint illustrated at 40 and fixed to the chassis frame of the vehicle not shown. On the shaft 37 is carried the operating lever 41 which is attached in any desired manner to the bracket operating lever not shown, but the operation of which through the mechanism just described will rotate the skeleton ring 9 in the brake mechanism.

In these Figures 1 and 5, at 42 is shown the front axle and bracket 43 therefor, for providing the necessary pivotal connection with the wheel hub.

A contractile spring 44 is illustrated in Figure 5, which is attached at one end to the lever 30 and at the opposite end to a fixed point as at 45 to the disc of the wheel hub, the same being for a like purpose as the spring 24 on the rear wheels.

From the foregoing it is evident that the expansive braking surface being divided into a plurality (in this instance four) separate radially movable shoes, being expandable by but a comparatively slight rotative movement of the skeleton collar requires no subsequent adjustment whatever of the lever mechanism for such movement, as the brake lining may be completely worn out before the limit of movement of the operating mechanism is reached.

It will be noted that the transverse bearings for the rollers 16 in the inner rim of the brake shoes and the outer rim of the ring 9 contact only at the smaller ends of the rollers, while the larger central portion thereof freely rotates in the circumferential grooves 15 in these two cooperative elements; this construction being illustrated as the most convenient in respect to manufacture, as the grooves 15 may be thus more conveniently formed than as by milling. As these grooves are annular, one opposite the other, they form convenient means for the application of a lubricant in the form of hard grease or the like, to insure smooth and silent working of the device.

Having thus described my invention, what I claim and desire to secure by Letters Patent, is:

1. A brake mechanism for vehicle wheels, comprising a brake drum, expandable brake shoe segments within the drum, a collar within said segments, said segments having central aligned longitudinal recesses therein and a plurality of spaced inclined planes thereupon and said collar having a central longitudinal recess therein, and roller means having an enlarged central portion registrable within said recesses for expanding said segments by traversing said planes.

2. A brake mechanism for vehicle wheels comprising a brake drum, expandable brake shoe segments having inclined planes upon the inner surfaces thereof within the drum, a collar within said segments, the adjacent surfaces of the segments and collar being provided with a central longitudinal recess and spaced transverse recesses, and roller means having an enlarged central portion registrable within said longitudinal recess and the end portions of the roller means being registrable within said transverse recesses for expanding said segments by traversing said planes.

WILLIAM R. BREWER.